(12) United States Patent
Bohn

(10) Patent No.: US 7,061,471 B2
(45) Date of Patent: Jun. 13, 2006

(54) SCROLL WHEEL ASSEMBLY USING A UNIDIRECTIONAL LOCKING SYSTEM

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 10/630,845

(22) Filed: Jul. 31, 2003

(65) Prior Publication Data

US 2005/0024333 A1    Feb. 3, 2005

(51) Int. Cl.
*G09G 5/00* (2006.01)
(52) U.S. Cl. .................. 345/163; 345/169; 345/684
(58) Field of Classification Search ........ 345/156–169, 345/684–686; 463/37–38; 715/784–787
See application file for complete search history.

(56) References Cited

U.S. PATENT DOCUMENTS

| | | | |
|---|---|---|---|
| 6,348,912 B1 * | 2/2002 | Smith .................. | 345/163 |
| 6,496,180 B1 * | 12/2002 | Hedman ............... | 345/166 |
| 6,563,490 B1 * | 5/2003 | Wang et al. .......... | 345/165 |
| 6,570,108 B1 * | 5/2003 | Lin ...................... | 200/6 B |
| 6,987,505 B1 * | 1/2006 | Koo ..................... | 345/163 |
| 7,012,594 B1 * | 3/2006 | Wang ................... | 345/163 |
| 2003/0201979 A1 * | 10/2003 | Sandage et al. ...... | 345/164 |

* cited by examiner

*Primary Examiner*—Lun-Yi Lao
(74) *Attorney, Agent, or Firm*—Banner & Witcoff, Ltd.

(57) ABSTRACT

A computer input device includes a scrolling apparatus that includes a rotatable scroll wheel and a scroll wheel locking device. The scroll wheel locking device is activated when the document being scrolled reaches its end. When activated, the scroll wheel locking device prevents further rotation of the scroll wheel in the direction that would normally be past the end of the document, but permits rotation of the scroll wheel in the opposite direction towards the other end of the document. The scroll wheel locking device includes lockable wheel rotatable with and spaced from the scroll wheel. The lockable wheel includes angularly spaced pins. A tri-position lever includes locking elements engagable with the teeth to cause unidirectional locking.

20 Claims, 9 Drawing Sheets

SCROLL WHEEL ASSEMBLY USING A UNIDIRECTIONAL LOCKING SYSTEM

BACKGROUND OF THE INVENTION

1. Field of the Invention

The present invention relates to a scrolling apparatus for repositioning an image relative to a display screen. More particularly, the invention relates to a scrolling apparatus that utilizes a stopping and locking system to terminate its rotation in a particular direction when the user reaches the end of a document. The invention has application to input devices, such as a mouse, trackball, or keyboard, to scroll an image relative to a display screen.

2. Description of Background Art

The viewable contents of a computer file, such as a text document, spreadsheet, digital photograph, Web page, or other image rendered on a conventional display screen, may possess a size exceeding the viewable boundaries of the display screen. To address this issue, an individual may utilize a scrolling apparatus to reposition the image relative to the display screen, thereby permitting the individual to view portions of the computer file not currently rendered. As utilized herein, scrolling describes a translatory movement of the image relative to the display screen and in a particular direction. For example, scrolling down generally describes a movement of the image relative to the display screen so as to produce an effect of moving downward in the image. Similarly, scrolling up, scrolling left, and scrolling right generally describe movement of the image relative to the display screen so as to produce an effect of moving the image upward, left, and right, respectively.

Scrolling apparatuses have been incorporated into a plurality of peripheral input devices, including computer mice and trackball pointing devices, and keyboards, for example. An example of a computer mouse incorporating a scrolling apparatus is disclosed in U.S. Pat. No. 5,912,661 to Siddiqui, which is hereby incorporated by reference. Elements of the scrolling apparatus include a finger-engageable scroll wheel and a sensor assembly. The scroll wheel is mounted within a housing of the computer mouse, and a portion of the scroll wheel protrudes from an opening in the housing to permit an individual to selectively rotate the scroll wheel. The sensor assembly detects rotation of the scroll wheel and transmits a corresponding signal to a host computer, thereby directing the image to scroll relative to the display screen. By rotating the scroll wheel in a first direction, an image on a display screen may be scrolled upward, for example. Similarly, by rotating the scroll wheel in an opposite second direction, the image may be scrolled downward. Accordingly, a scroll wheel may be operated in a bi-directional manner to vertically scroll the image relative to the display screen.

Based on the size of the document the user is scrolling within, the user may have to rotate the scroll wheel a large number of revolutions to reach a desired location in the document. Rather than scrolling slowly through the document, users commonly rotate the scroll wheel many times in a rapid manner because a slow controlled rotation can be time consuming. However, under such circumstances, it is common that the user will unintentionally "over-scroll" past the point of the intended location, and scroll to the end of the document, with additional scrolling commands being sent because there is an attempt to over-scroll past the end of the document. This results in the computer system scrolling the image to the end of the document, and then attempting to process extra scrolling commands that are not performed. In addition to wasted finger motion by the user, this results in a loss of efficiency in operating the computer.

SUMMARY OF THE INVENTION

It is an aspect of the invention to provide a mechanism for a scroll wheel that is linked to the document on the computer screen so that when the extremity of the document is reached in any direction (beginning, end, left or right) the scroll wheel of the input device, e.g., mouse, trackball, or keyboard, will "lock" and the wheel can no longer be activated in that direction and can only be reversed from that position.

In one aspect of the present invention, the invention includes a scroll wheel assembly and a locking system for the scroll wheel assembly. The locking system includes a wheel that is rotatable with the scroll wheel and a locking device that interfaces with the lockable wheel.

In another aspect, the invention provides an input device for scrolling an image relative to a display screen. The input device includes a scroll wheel that is rotatable in opposing first and second directions. A scroll wheel locking element is movable into a position that prevents the rotation of the scroll wheel in the first direction and permits rotation of the scroll wheel in the second direction.

In another aspect, the invention provides an input device for scrolling an image relative to a display screen. The input device includes a scroll wheel and a unidirectional scroll wheel locking system.

According to another aspect, an input device has a scroll wheel and a housing. The scroll wheel extends partially through an aperture in the housing and can be rotated in opposing directions. A controller within the housing is coupled to activate a scroll wheel locking element such that it can prevent the rotation of the scroll wheel in the first direction and permit rotation of the scroll wheel in the second direction.

In yet another aspect, the invention provides an input device with a scroll wheel for scrolling an image and a scroll wheel locking lever positionable in first, second, and third distinct positions.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose scrolling apparatuses for moving or scrolling an image relative to a display screen. Viewable portions of computer files, which include text documents, spreadsheets, digital photographs, computer-generated drawings, or Web pages, for example, may be rendered as an image on a display screen. The manner in which the image is configured to be rendered on the display screen determines whether all portions of the image are simultaneously rendered within viewable boundaries of the display screen. Accordingly, the image may be configured to possess dimensions fitting entirely within the viewable boundaries of the display screen. The same image, however, may also be configured to possess dimensions exceeding the viewable boundaries of the display screen. In other words, the image may include a rendered portion that is currently viewable on the display screen and a hidden portion that is not simultaneously viewable on the display screen. A scrolling member of the present invention is configured to enable the scrolling of the image relative to the display screen, to thereby revealing the hidden portions of the image, and a locking member is configured to selectively lock the scrolling member under various conditions such as reaching the end of the document.

Illustrative Operating Environment

A peripheral device, such as a mouse, trackball, or keyboard, may be operatively connected to a host computer and includes input devices which are configured for freeform cursor control or scrolling for moving an image in multiple axes relative to a display screen. In one aspect, the peripheral device has a rotatable scrolling member. Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. Such an illustrative host computer system is illustrated in FIG. 1.

Figure 1:
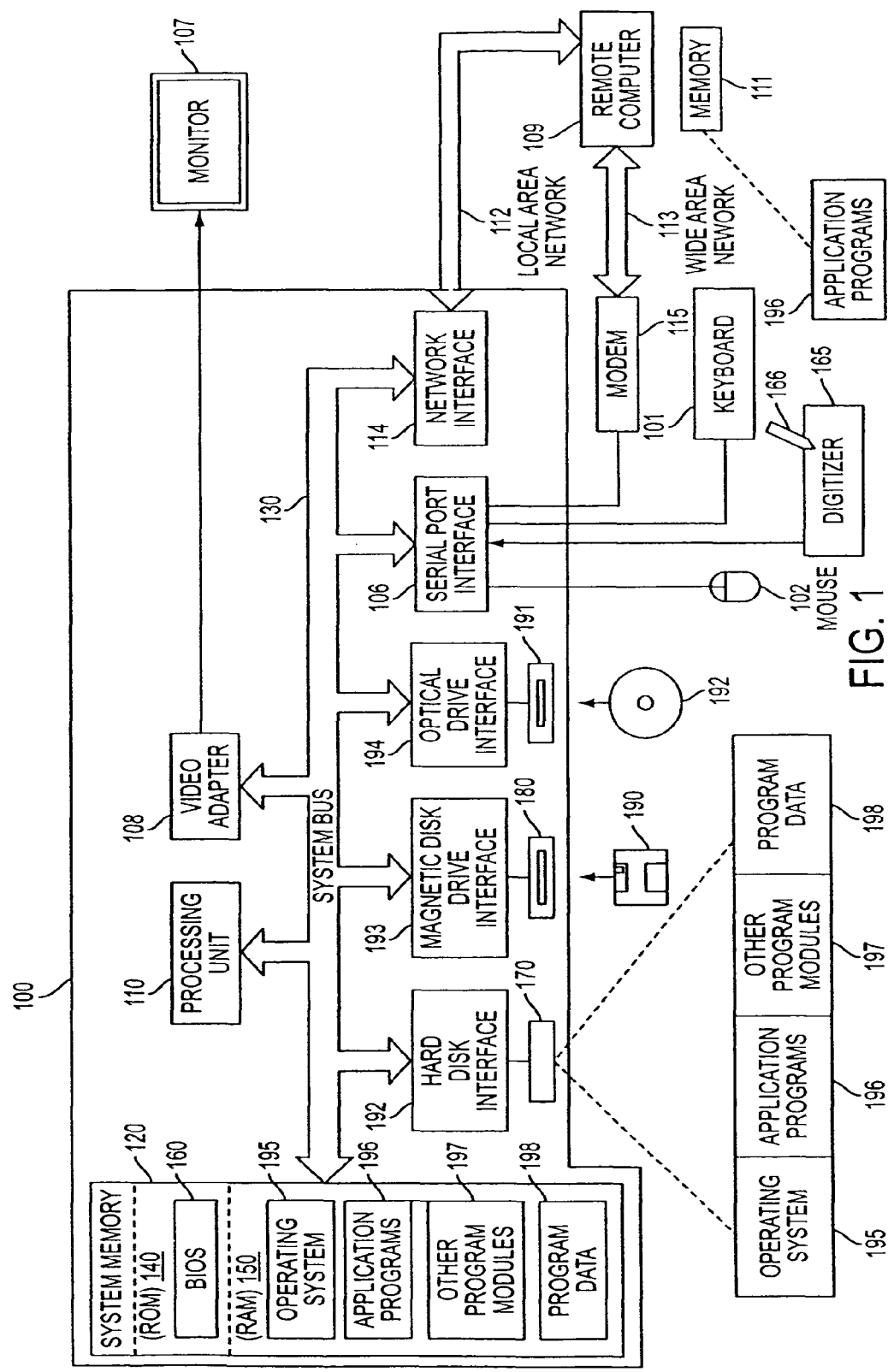
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a host computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 101 and a pointing device such as a mouse 102 and/or a trackball device (not shown). Other input devices (not shown) may include a digitizer 165 and digitizing pen 166, a microphone, a joystick, a game pad, a satellite dish, a scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Overview of the Input Device

Figure 2:
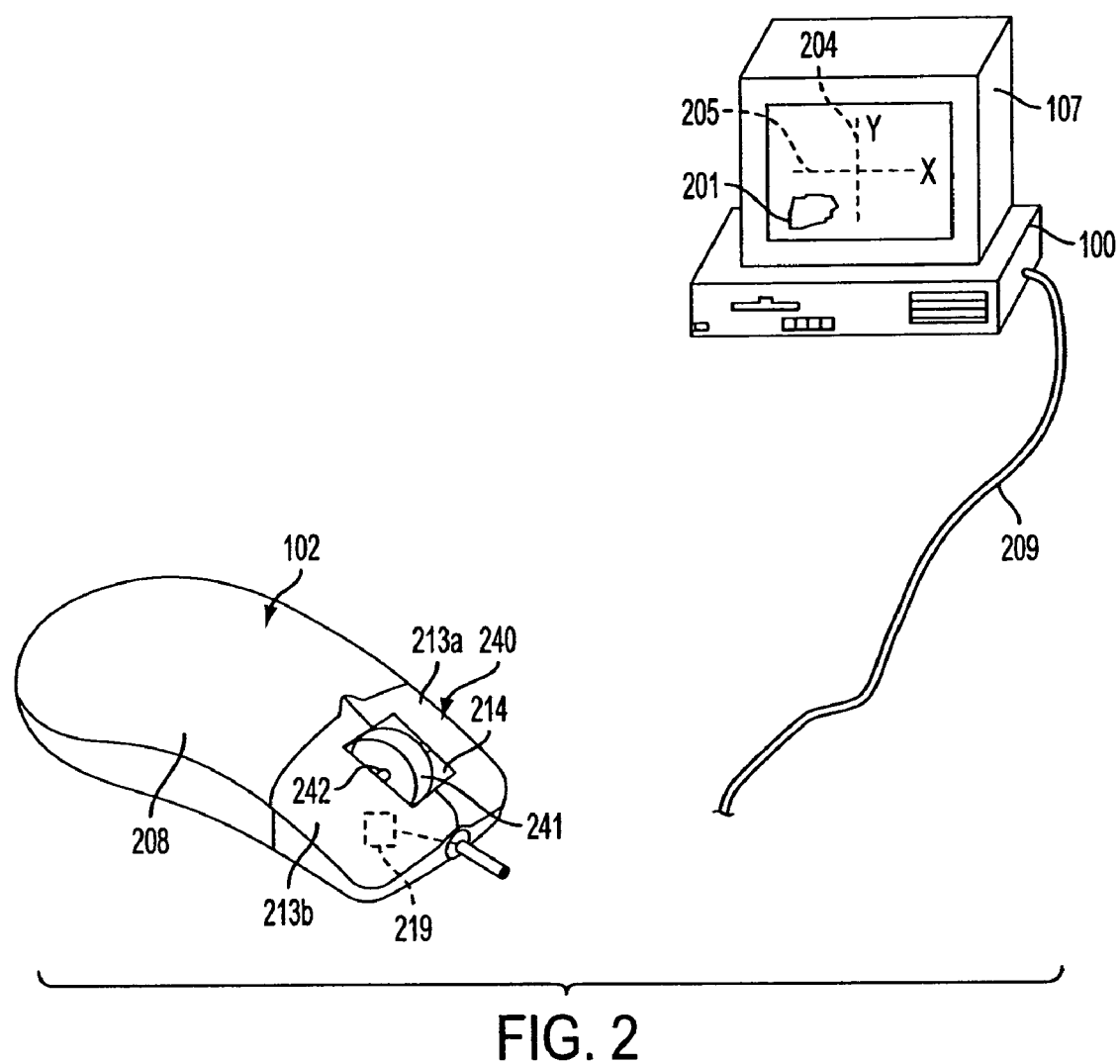
FIG. 2 is a perspective view of an input device incorporating a scrolling apparatus in accordance with the present invention, the input device being operatively connected to a host computer and a display device

FIG. 2 depicts an embodiment of a host computer 100 operatively connected to a display device such as a monitor 107, and an input device, which may be a computer mouse 102. One skilled in the relevant art will recognize that a computer file may be processed by the host computer 100 and a signal may be transmitted to the monitor 107, thereby directing the monitor 107 to render an image on the monitor 107. The image includes, in accordance with the discussion above, a schematically-represented rendered portion 201 and a hidden portion (not shown). An individual viewing the image will not, therefore, view all portions of the image simultaneously. To address this issue, the input device 102 incorporates a scrolling apparatus 240 that may be utilized by the individual to scroll the image relative to the display screen 107. For example, the image may be scrolled in a vertical direction, which corresponds with a y-axis 204. In further embodiments, or if operated under different conditions, the image may also be scrolled in a horizontal direction, which corresponds with an x-axis 205, or the image may be scrolled diagonally. Both the y-axis 204 and the x-axis 205 are depicted for reference on the display screen 107. The individual may, therefore, utilize the scrolling apparatus 240 to scroll the image relative to the display screen 107, thereby permitting the individual to view currently hidden portions of the image or to move a visible portion to a different location on the display monitor 107.

The scrolling apparatus 240 is depicted in the figures as being incorporated into the input device 102, which, in one embodiment, is a pointing device, particularly a computer mouse. In addition to the mouse-style pointing device, the scrolling apparatus 240 may also be incorporated into other types of input devices, including a trackball pointing device, a touchpad pointing device, and a keyboard 101, for example. Within the scope of the present invention, however, the scrolling apparatus 240 may also be incorporated into a plurality of other computer-related input devices, such as the bezel of a personal data assistant or handheld computing device, a web pad or other Internet appliance, a gaming controller, or a chassis of a notebook computer, for example. The manner in which the scrolling apparatus 240 may be incorporated into a computer system is not limited, therefore, to the precise example embodied by the input device in the drawings, but may be incorporated into a variety of components to provide the scroll wheel locking functions discussed herein.

The input device 102 is depicted individually in FIG. 2 and serves multiple functions, including the functions of the scrolling apparatus 240. As represented, the input device 102 is a mouse-style pointing device having an outer housing 208 generally shaped to interface with the shape of a hand. A tracking assembly (not depicted) is partially enclosed within the housing 208 for detecting movement of the input device 102 relative to a support surface, as is known in the art. The tracking assembly includes a rollball that engages perpendicular rollers. The rollball protrudes outward from the bottom of the housing 208 and rotates in multiple directions. A first roller senses movement of the mouse (via the movement of the rollball) in a first direction, while a second roller senses movement of the mouse 102 (via the movement of the rollball) in a second direction. An optical tracking system may alternatively be employed, as is known in the art. Upon rotation of the rollball, a signal is transmitted to the host computer 100 through a cord 209, thereby directing the host computer 100 to move a cursor on the display screen 107. Alternately, the signal may be transmitted to the host computer 100 through a wireless connection, as is known in the art. On its housing 208, the input device 102 also includes a primary key 213a and a secondary key 213b for manipulating objects, such as hypertext links, buttons, or icons, on the display screen 107, as is known in the art. In general, the cursor may be positioned over an object through use of the tracking assembly, and one of keys 213a and 213b may be depressed, thereby manipulating the object by transmitting a corresponding signal to the host computer 100.

The housing 208 includes an aperture 214 therein for exposing and providing access to a scroll wheel 241 of the scrolling apparatus 240. The aperture 214 is preferably positioned between keys 213a and 213b. The scrolling apparatus 240 includes the scroll wheel 241 that protrudes upwardly through the aperture 214 and has a generally circular or wheel-shaped structure for engagement by the user. The exterior surface of the scroll wheel 241 may be smooth or grooved. An axle 242 extends through a central portion of the scroll wheel 241 to define an axis of rotation for the scroll wheel 241. Portions of the axle 242 are rotatably-mounted on a pair of supports 243 and 244 (shown in FIG. 3) thereby permitting the scroll wheel 241 to rotate with the axle 242 in either a forward or backward direction about axis 242a. As utilized herein, the term "scroll wheel" denotes a rotatable structure configured to enable scrolling of an image on a display screen as it is rotated.

When operating the mouse 102, the hand of the individual will generally rest upon an upper surface of the housing 208 such that the fingers extend over keys 213a and 213b and over the scrolling apparatus 240. The fingers may then be utilized to operate keys 213a and 213b and the scrolling apparatus 240. Within the scope of the present invention, however, the aperture 214 and the scroll wheel 241, may be located in other portions of the housing 208. As discussed above, the scrolling apparatus 240 may also be incorporated into other input devices. With regard to the keyboard 101, trackball, handheld computing device, or notebook computer, for example, an aperture for the scrolling apparatus 240 may be located at any position that provides the individual with convenient access for operating the scroll wheel 241 of the scrolling apparatus 240.

The configuration and operation of a rotational sensor assembly will now be discussed. In general, the sensor assembly includes an optical-based arrangement that detects rotational movement of the scroll wheel 241 and transmits a corresponding signal to the host computer 100, thereby causing the viewable image 201 to move relative to the display screen 107. More specifically, rotation of the scroll wheel 241 induces a corresponding substantial proportional rotation in an encoder wheel 251. The encoder wheel 251 and the scroll wheel 241 are preferably mounted to a common axle 242, and the axle 242 is preferably supported for rotation by upstanding supports 243 and 244.

The encoder wheel 251 includes a plurality of blades 252 and openings 253 extending radially outward from a central area of the encoder wheel 251. Openings 53 are generally located between blades 252 and in peripheral portions of the encoder wheel 251. A light source 254 and a light sensor 255, which may be a light emitting diode and a phototransistor, respectively, are positioned on opposite sides of the encoder wheel 251. As utilized herein, the term "encoder wheel" denotes a rotatable wheel or disk that assists with the detection of rotation, and may include a plurality of openings (or reflective surfaces) that permit the transmission of (or reflect) light or another detectable waveform.

In a known manner, as the encoder wheel 251 rotates, light from the light source 254 is alternately (1) transmitted through openings 253 and (2) blocked by the material of blades 252. Pulses of light are transmitted through openings 253 as the encoder wheel 251 rotates enter the light sensor 255. In response to the pulses of light, the light sensor 255, or a microprocessor operatively connected to the light sensor 255, transmits a signal to the host computer 100 that indicates data relating to the angular rotation of the scroll wheel 241, thereby inducing the image 201 to scroll relative to the display screen 107. Furthermore, the frequency of the pulses is associated with the rate at which the scroll wheel 241 is being rotated. This can be used to control the speed at which the image 201 scrolls. Alternative arrangements for sensing the rotation of the scroll wheel 241 may be used.

Figure 3:
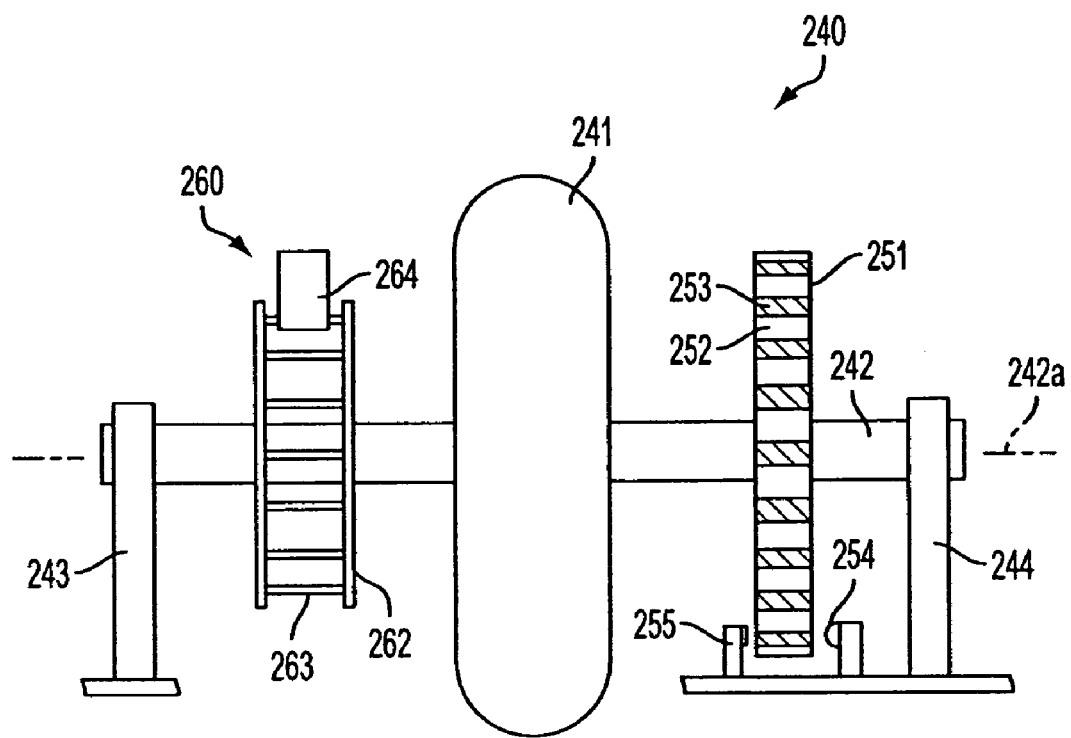
FIG. 3 is a schematic side view illustrating an exemplary embodiment of the scroll wheel assembly.

As can be seen in FIG. 3, the scroll wheel assembly 240 also includes a scroll wheel locking assembly 260. In an exemplary embodiment, the locking assembly 260 is actuable under certain operating conditions prevent the rotation of the scroll wheel in a first direction and permit the rotation of the scroll wheel in the second (opposite) direction. The locking assembly 260 is also actuable under certain operating conditions to permit the rotation of the scroll wheel in the first direction and prevent the rotation of the scroll wheel in the second (opposite) direction. Further, the scroll wheel locking assembly 260 is selectively operable to permit the rotation of the scroll wheel in both rotatable directions under various operating conditions. Thus, for example, when the user scrolls downward to the bottom (end) of a document by rotating the scroll wheel backward (i.e., toward the user), the scroll locking assembly 260 locks the scroll wheel 241 upon reaching the bottom of the document so that the scroll wheel 241 cannot be physically rotated backward any farther and can only be rotated forward. When the user scrolls forward to the top (end) of a document by rotating the scroll wheel forward (i.e., away from the user), the scroll locking assembly 260 locks the scroll wheel 241 upon reaching the top of the document so that the scroll wheel 241 cannot be physically rotated forward any farther and can only be rotated backward. When the portion of the displayed image is in the middle of the document, the scroll locking assembly 260 permits rotation of the scroll wheel 241 in both directions.

The locking assembly 260 includes a lockable wheel 262 and a locking device 264 that is engagable with the lockable wheel 262. The lockable wheel 262 is preferably mounted on the axle 242, and preferably spaced from the scroll wheel 241, such that the rotation of the scroll wheel 241 in a direction causes the lockable wheel 262 to rotate in that same direction.

Figure 4:
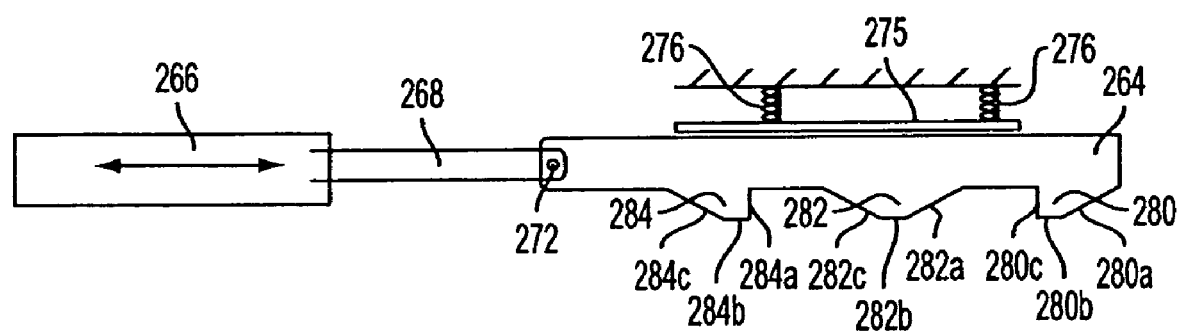
FIG. 4 is a schematic side view of the locking member of the scroll wheel assembly coupled to an actuator.

FIG. 4 illustrates the locking device 264 and the system for moving the locking device with the lockable wheel 262 being removed from this figure for clarity. The locking assembly 260 further includes an actuator 266 and an arm 268. The actuator 266, which is preferably a solenoid such as a SMT C-frame proportional solenoid, is configured to move the locking device 264 between multiple distinct positions with respect to the lockable wheel 262. In an exemplary embodiment, the coupling arm 268 has a first end coupled to the actuator 266 and an opposing second end 272 pivotally coupled to the locking device 264. In one arrangement, the actuator 266 is controlled by a controller 219, such as a microprocessor, within the input device 102.

Figure 5:
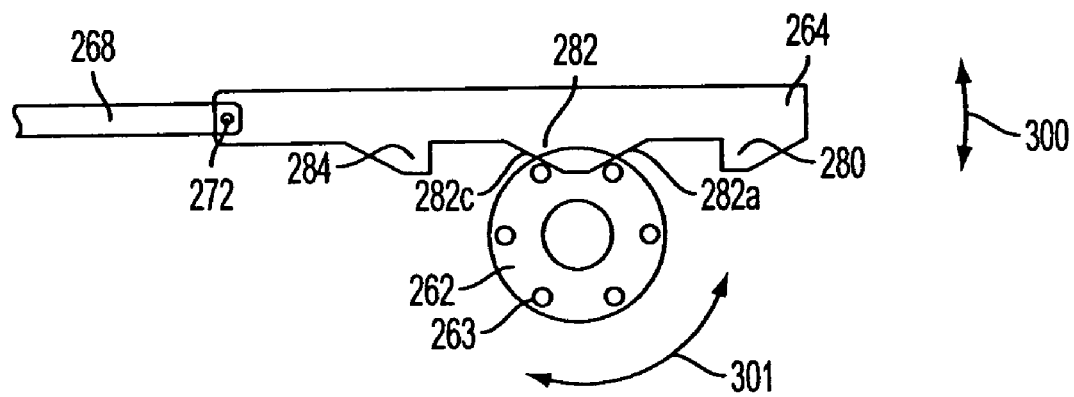
FIGS. 5–7 are schematic side views of the scroll wheel locking assembly with the locking member being in different positions relative to the lockable wheel.
Figure 6:
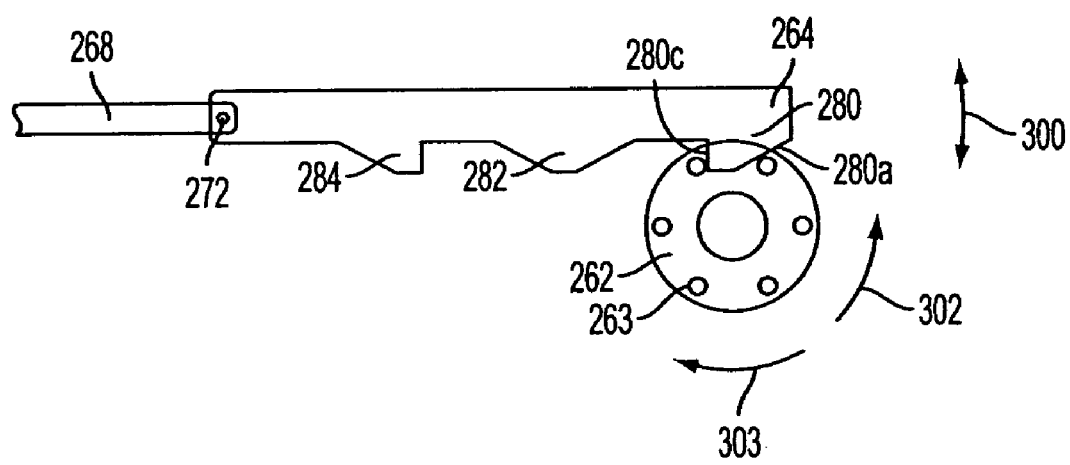
Figure 7:
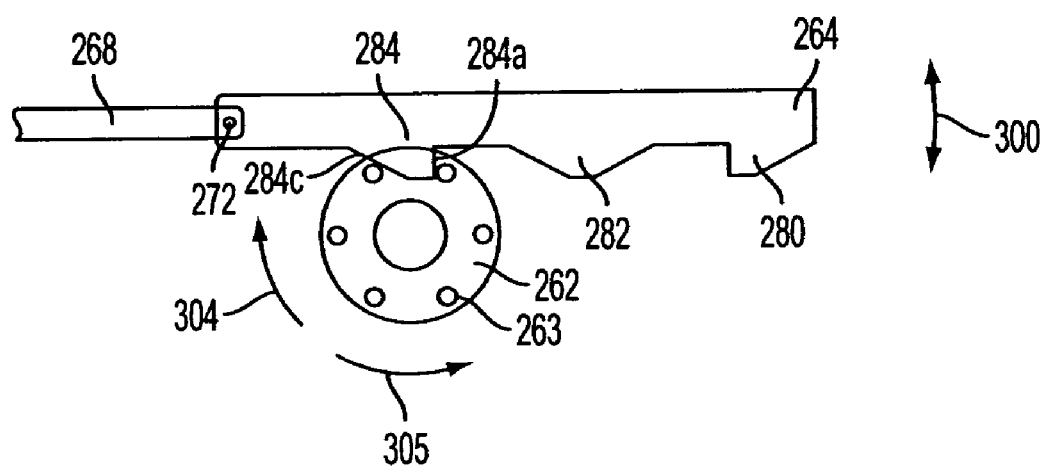

In an exemplary embodiment, the locking device 264 is movable by the actuator 266 between three predetermined positions: a center or neutral position as shown in FIG. 5, a forward locking position (permitting only backward scroll wheel rotation) as shown in FIG. 6, and a backward locking position (permitting only forward scroll wheel rotation) as shown in FIG. 7. The locking device 264 preferably includes interfacing teeth or steps 280, 282, and 284 that interface with angularly spaced pins 263 located on the lockable wheel 262. The locking device 264 is disposed tangentially to the lockable wheel 262. More specifically, the locking device 264 is disposed such that the interfacing teeth 280, 282, and 284 are tangentially disposed from the pins 263. For reference purposes, the interfacing teeth are referenced as front tooth 280, middle tooth 282, and rear tooth 284. In the depicted arrangement, the locking device 264 is positioned adjacent the top of the lockable wheel 262. Further, the locking device is preferably, but need not be, configured such that the actuator 266 is behind the scroll wheel 241.

When the locking device 264 is in a middle or neutral position as shown in FIG. 5, the middle tooth 282 is configured to interface with the pins 263. The middle tooth 282 includes a pin-interfacing contour that enables the pins 263 from the lockable wheel 262 to ride on the bottom of the middle tooth 282 without being locked as they pass the tooth 282. In an exemplary embodiment, as shown, the middle tooth 282 includes angled front and rear surfaces 282a and 282c and a flat center surface 282b. The angled front and rear surfaces 282a and 282c are disposed to form an obtuse angle relative to a tangent line of then engaging pin such that the surfaces 282a–282c permit the then engaging pin to pass. Thus, this configuration permits the pins 263 to contact and pass the middle tooth 282 as the scroll wheel 241 is rotated. When contact is made between the then engaging pin and the applicable angled surface 282a or 282c, the then engaging pin 283 applies an upward force to the locking device 264 via an angled surface 282a or 282c causing the locking device 264 to pivot about the pivot connection 272 between the arm 268 and the locking device 264.

As the scroll wheel 241 is rotated in either direction shown by arrow 301, the middle tooth 282 alternately gets forced upward (away from the lockable wheel 262) by an engaging pin 263 and returns (moves downward) between adjacent pins 263. This movement of the locking device 264 as indicated by arrow 300. This arrangement provides a detented feel to the scroll wheel 241. In an alternate embodiment, not shown, the center surface 282b is eliminated. If desired, this detented feel can be eliminated in the center position or a detent system can be provided for elsewhere in the scroll assembly 240. In such a configuration, the locking device 264 may be guided in such a way that there is no engagement of the pins 263 in the center position and the middle tooth 282 may be eliminated.

The locking member 264 return process after it is forced upwardly can be caused entirely or in part to gravity. In addition or in lieu of the gravity biasing of the locking device 264, if desired, one or more springs 275 as shown in FIG. 4 may be used to provide a slight biasing force to the locking device 264 in the direction of the pins 263. Since the locking device 264 is movable forward and backward in addition to up and down, a low friction guide plate 276 may be disposed at the bottom of the spring(s) 275 to minimize the friction with the biasing system when the locking device 264 is moved between its positions. Such a biasing arrangement enables a more controlled movement of the locking device 264 as it applies a desired force regardless of the mounting angle of the locking device 264 and the orientation of the input device. Additionally, a frame or guide track, not shown, may be provided to limit or otherwise provide a more controlled movement of the locking device 264.

When the lockable device is in a rearward position as shown in FIGS. 6, the front tooth 280 is configured to interface with the pins 263. The front tooth 280 includes a pin-interfacing contour that enables the pins 263 from the lockable wheel 262 to ride on the bottom of the front tooth 280 without being locked when the scroll wheel 241 is rotated backward (i.e., toward the user) as represented by arrow 302. This typically causes scrolls down in the document. In an exemplary embodiment, as shown, the front tooth 280 includes an angled front surface 280*a* and a flat center surface 280*b*. The angled front surface 280*a* is disposed to form an obtuse angle relative to a tangent line of then engaging pin such that the front surface 280*a* permits the then engaging pin to pass.

This configuration allows the pins 263 to pass the forward tooth 280 as the engagement between the pins 263 and the angled surface 280*a* and the flat surface 280*b* applies an upward force to the locking device 264 causing the locking device 264 to pivot about the pivot connection between the arm 268 and the locking device 264 when the wheel is rotated in the direction of arrow 302. As the scroll wheel 241 is rotated in the direction of arrow 302, the front tooth 280 alternately gets forced upward by an engaging pin 263 and returns by gravity and/or a mechanical force into the next gap between adjacent pins 263 as indicated by arrow 300. This configuration provides a detented feel to the scroll wheel 241. In an alternate embodiment, not shown, the center surface 280*b* is eliminated.

In contrast to the front surface 280*a*, the rear surface 280*c* of the front tooth 280 is a locking surface. The rear surface 280*c* is disposed to form non-obtuse angle (i.e., either a right angle or an acute angle) relative to a tangent line of then engaging pin such that the rear surface 280*c* prevents the then engaging pin from passing when the scroll wheel 241 is rotated in the direction of arrow 303. In a preferred arrangement, the rear surface forms an angle in the range between 80 and 90 degrees relative to the tangent line of then engaging pin. This locking feature is due to the fact that then engaging pin substantially applies only a lateral force and fails to apply an upwardly force. Accordingly, the locking member 264 does not move upwardly. Thus, the rear surface 280*c* is disposed relative to pins of the wheel 262 to prevent the lockable wheel 262 (and the scroll wheel 241) from rotating when the user attempts to rotate the scroll wheel 241 forwardly away from the user (i.e., in the direction of arrow 303).

Figure 8:
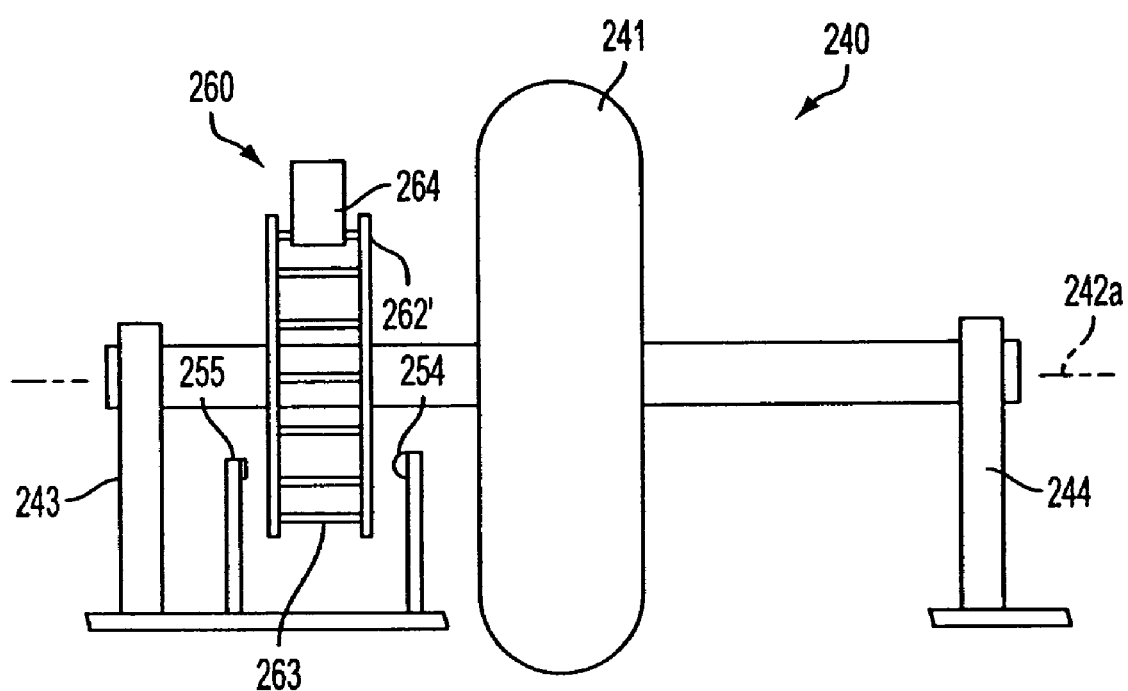
FIG. 8 is a schematic isometric view of the scroll wheel locking assembly illustrating an alternative arrangement.

The rear tooth 284, is configured similar to the front tooth 280 in a mirror image arrangement. Thus, when the lockable device is in a forward position as shown in FIGS. 7 and 8, the rear tooth 284 is configured to interface with the pins 263. The rear tooth 284 includes a pin-interfacing contour that enables the pins 263 from the lockable wheel 262 to ride on the bottom of the rear tooth 284 without being locked when the scroll wheel 241 is rotated forward (i.e., away from the user) as represented by arrow 304. This typically causes scrolls up in the document. In an exemplary embodiment, as shown, the rear tooth 284 includes an angled rear surface 284*a* and a flat center surface 284*b*. The angled rear surface 284*c* is disposed to form an obtuse angle relative to a tangent line of then engaging pin such that the rear surface 284*c* permits the then engaging pin to pass.

This configuration allows the pins 263 to pass the rear tooth 284 as the engagement between the pins 263 and the angled surface 284*a* and the flat surface 284*b* applies an upward force to the locking device 264 causing the locking device 264 to slightly pivot about the pivot connection between the arm 268 and the locking device 264 when the wheel is rotated in the direction of arrow 304. As the scroll wheel 241 is rotated in the direction of arrow 304, the rear tooth 284 alternately gets forced upward by an engaging pin 263 and returns by gravity and/or a mechanical force into the next gap between adjacent pins 263 as indicated by arrow 300. This configuration provides a detented feel to the scroll wheel 241. In an alternate embodiment, not shown, the center surface 284*b* is eliminated.

In contrast to the rear surface 284*c*, the front surface 284*a* of the rear tooth 284 is a locking surface. The front surface 284*a* is disposed to form non-obtuse angle (i.e., either a right angle or an acute angle) relative to a tangent line of then engaging pin such that the front surface 284*a* prevents the then engaging pin from passing when the scroll wheel 241 is rotated in the direction of arrow 305. In a preferred arrangement, the front surface 284*a* forms an angle in the range between 80 and 90 degrees relative to the tangent line of then engaging pin. This locking arrangement is due to the fact that then engaging pin substantially applies only a lateral force and fails to apply an upwardly force. Accordingly, the locking member 264 does not move upwardly. Thus, the front surface 284*a* is disposed relative to pins of the wheel 262 to prevent the lockable wheel 262 (and the scroll wheel 241) from rotating when the user attempts to rotate the scroll wheel 241 forwardly away from the user (i.e., in the direction of arrow 305).

The lockable wheel 262 with pins 263 and the locking member 264 form a ratchet and pawl device to lock the scroll wheel 241 against movement in certain directions and to permit rotation of the scroll wheel 241 under different conditions. When the locking device 241 is moved to either the rearward or forward positions as shown in FIGS. 6 and 7, the lockable wheel 262 will slide over the positioned tooth 280 or 284 when the scroll 241 wheel rotates one way. However, when the scroll wheel 241 rotates the other way, a pin 263 from the lockable wheel 262 catches on the locking surface of the tooth.

FIG. 8 is similar to FIG. 3 but illustrates an alternative arrangement of various elements. Specifically, a separate encoder wheel 251 is no longer needed and the lockable wheel 262' includes openings formed by angularly spaced slits in a plate perpendicular to the axis of rotation. The slits are preferably, but need not be, located radially inwardly of the pins 262. The light source 254 and a light sensor 255 are positioned accordingly such that as the lockable wheel 262' with encoder wheel characteristics rotates, light from the light source 254 is alternately (1) transmitted through the openings and (2) blocked by the material between the openings.

The computer 100 provides feedback to the input device 102 about the position of the viewable documents relative the display 107. Based on that feedback, it can provide an instruction to the controller 219 of the input device 102 about when to actuate the lockable member 264 which of the three positions to move it into. One method to control the locking assembly is depicted in FIG. 9.

Figure 9:
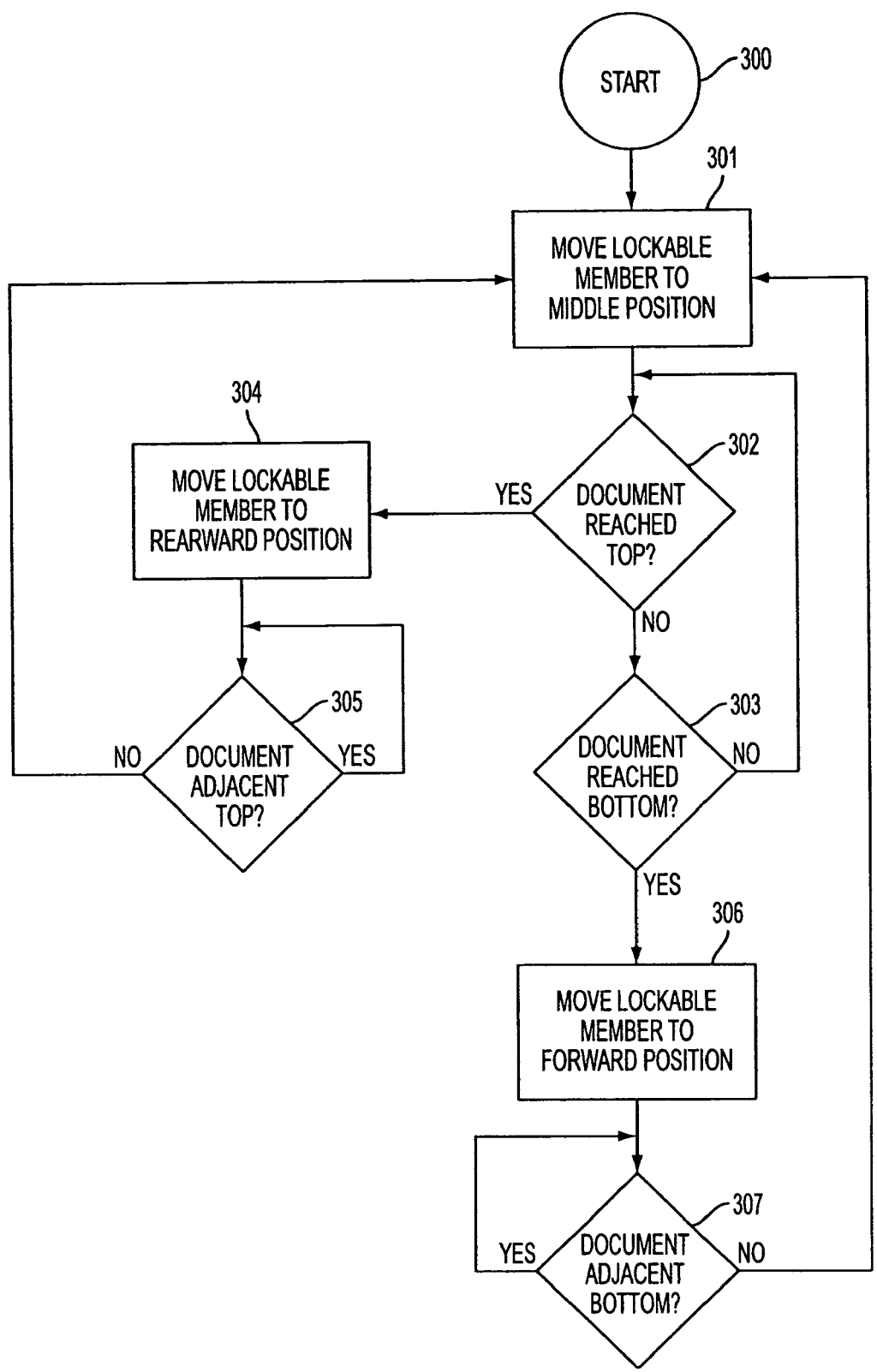
FIG. 9 is a flowchart depicting the operation of scroll wheel according to an embodiment of the invention.

FIG. 9 illustrates an operational flow chart of the control of wheel locking device 264 according to an exemplary operational method. This method presumes that the document is larger than the display screen and that a scrolling mode is operational. From an initialization point 300, the actuator 266 moves the lockable member 264 into the middle position at Step 301 as shown in FIG. 5. The process then determines whether the viewable document is at one of its ends. This is shown by Step 302 that checks to see whether the viewable document is at the top and by Step 303 that checks to see whether the viewable document is at the bottom. This information exists and is used in various programs, and the results of such are commonly illustrated as a vertically-oriented graphical user image of a scroll bar commonly used by many computer programs. To illustrate the scroll bar, an application may set a scrolling range and calculate the location of an indicator (a "thumb") that moves within the range. In operation, scrolling movement commands are processed and the graphical user scroll bar interface with the thumb is revised based on the scroll range and the scrolling movements applied. Thus it can be calculated whether the document is at its top or at its bottom and it is that information that can be used at Steps 302 and 303.

If at Step 302 and at Step 303 it is determined that the document has not reached either end of the scroll range, the document end checking process continues and the lockable member 264 will remain in its middle position as shown in FIG. 5. However, if at Step 302, the top of the document is reached by the user scrolling upwardly by rotating the scroll wheel 241 away from himself, the computer 100 will instruct the actuator 266 via the controller in the input device to move the locking member to the rearward position as shown in FIG. 6. This will stop the rotation of the scroll wheel. With the locking member 264 in this position, the user will not be able to rotate the scroll wheel 241 away from him and scroll upwardly because the scroll wheel 241 will be physically locked. The user will however be able to rotate the scroll wheel 241 in the opposite direction, i.e., toward him, to scroll down in the document.

At step 305, it is determined whether the document is still at or adjacent the top (e.g., only a small amount of scrolling has occurred). If the answer to that question is yes, the process continues to check and will not change until the document is no longer adjacent the top. When the document is scrolled down such that it is no longer adjacent to the top, the computer instructs the actuator 266 to move the lockable member 264 into the middle position at Step 301 as shown in FIG. 5.

Whether the document is still "adjacent" an end may be calculated on a unit basis (such as scroll lines) or on the basis of the percentage of the document traveled. Further, the "adjacent" value may be preset into the system or may be made to be modifiable by a user setting. Thus, when the user scrolls downwardly by a small amount and is no longer adjacent to the top of the document, the actuator 266 moves the lockable member 264 into the middle position.

A similar process occurs at the bottom of the document as shown by Steps 303, 306, and 307. If at Step 303, it is determined that the bottom of the document is reached by the user scrolling down by rotating the scroll wheel 241 toward himself, the computer 100 will instruct the actuator 266 via the controller in the input device to move the locking member to the forward position as shown in FIG. 7. This will stop the rotation of the scroll wheel. With the locking member 264 in this position, the user will not be able to rotate the scroll wheel 241 toward himself and scroll down because the scroll wheel 241 will be physically locked. The user will however be able to rotate the scroll wheel 241 in the opposite direction, i.e., away from him, to scroll up in the document.

At step 307, it is determined whether the document is still at or adjacent the bottom (e.g., only a small amount of scrolling has occurred). If the answer to that question is yes, the process continues to check and will not change until the document is no longer adjacent the bottom. When the document is scrolled up such that it is no longer adjacent to the bottom, the computer instructs the actuator 266 to move the lockable member 264 into the middle position at Step 301 as shown in FIG. 5.

Thus, this process prevents wasted computer processing efforts, and provides touch feedback information to the user as a reminder that the document has reached and/or is at an end, and which end the document is at or near. It further can save the user unnecessary finger movements that can be beneficial especially if the user has a finger injury or other precondition or uses the scrolling wheel on a regular basis. Further, this provides a mechanism for a scroll wheel that is linked to the document on the computer screen so that when the extremity of the document is reached in any direction (beginning, end, left or right) the scroll wheel of the input device, e.g., mouse, trackball, or keyboard, will "lock" and the wheel can no longer be activated in that direction and can only be reversed from that position.

The specific configurations of the lockable scrolling apparatus described and illustrated herein is intended to provide an example of the many configurations intended to fall within the scope of the present invention. Accordingly, the configuration of the scrolling apparatus may depart from the specific configuration disclosed above.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An input device for scrolling an image relative to a display screen, the input device comprising:
   a scroll wheel rotatable in opposing first and second directions about an axis; and
   a scroll wheel locking element movable to a first position that prevents the rotation of the scroll wheel in the first direction and permits rotation of the scroll wheel in the second direction, and movable to a second position that prevents the rotation of the scroll wheel in the second direction and permits rotation of the scroll wheel in the first direction.

2. The input device recited in claim 1, further comprising a lockable wheel, wherein the lockable wheel and the scroll wheel are coupled to one another.

3. The input device recited in claim 2, wherein the lockable wheel and the scroll wheel are coupled to a common axle.

4. The input device recited in claim 2, wherein the lockable wheel includes a plurality of angularly spaced pins.

5. The input device recited in claim 1, further comprising a solenoid coupled to the scroll wheel locking element to move the scroll wheel locking element between multiple positions.

6. The input device recited in claim 1, wherein the input device is one of a mouse, a trackball, and a keyboard.

7. The input device recited in claim 6, wherein the scroll wheel locking element includes a plurality of spaced teeth.

8. An input device for scrolling an image relative to a display screen, the input device comprising:
   a scroll wheel rotatable in opposing first and second directions;

a unidirectional scroll wheel locking system, wherein the unidirectional scroll wheel locking system includes a ratchet and a pawl, wherein the ratchet is a lockable wheel;

an axle, wherein the scroll wheel and the lockable wheel are mounted to the axle such that rotation of the scroll wheel causes rotation of the lockable wheel, the lockable wheel being spaced from the scroll wheel; and a light source and a light sensor positioned on opposite sides of the lockable wheel.

9. The input device recited in claim 8, wherein the lockable wheel includes a plurality of openings defined therein such that light from the light source may pass through the openings and toward the light detector when the lockable wheel rotates.

10. The input device recited in claim 8, wherein the pawl is operable to permit motion rotational movement in a first direction only when in the pawl is in a first position, and is operable to permit motion rotational movement in a second direction only when in the pawl is in a second position.

11. The input device recited in claim 10, wherein the pawl is movable to a third position, between the first and second positions, which permits rotational movement of the scroll wheel in both the first and second directions.

12. The input device recited in claim 11, wherein the pawl is pivotally coupled to an arm, and the arm is pivotally coupled to an actuator, the input device further comprising a biasing device acting on the pawl.

13. An input device for scrolling an image relative to a display screen, the input device comprising:

a housing having an aperture;

a scroll wheel extending partially through the aperture, the scroll wheel being rotatable in opposing first and second rotational directions;

a scroll wheel locking element movable in a first direction and biased in a second direction, the second direction being angularly displaced from the first direction; and a controller configured to activate a scroll wheel locking element to prevent the rotation of the scroll wheel in the first rotational direction and permit rotation of the scroll wheel in the second rotational direction.

14. The input device recited in claim 13, wherein the input device is one of a mouse, a trackball, and a keyboard.

15. The input device recited in claim 13, wherein the controller is configured to activate the scroll wheel locking element in response to a user scrolling a document to an end of the document.

16. The input device recited in claim 15, wherein the controller includes a microprocessor.

17. An input device for scrolling an image relative to a display screen, the input device comprising:

a scroll wheel rotatable in opposing first and second directions; and a scroll wheel locking lever positionable in first, second, and third distinct positions;

wherein the scroll wheel locking lever moves along a path between the first, second, and third positions.

18. The input device recited in claim 17, further comprising a lockable wheel having angularly spaced lockable members and wherein the scroll wheel locking lever is tangential to the lockable members.

19. The input device recited in claim 17, wherein the scroll wheel locking lever has a locking element including a first surface and a second surface, wherein the first surface is disposed to physically engage an angularly spaced lockable member and prevent rotation of the lockable wheel when the scroll wheel is rotated in a first direction, and the second surface is disposed to physically engage an angularly spaced lockable member by permitting the rotation of the lockable wheel when the scroll wheel is rotated in a second direction.

20. The input device recited in claim 17, further comprising an actuator coupled to the scroll wheel locking lever to move the scroll wheel locking lever between the first, second, and third positions.

* * * * *